G. C. BERLIN & C. H. SEBREE.
VEHICLE WHEEL.
APPLICATION FILED MAY 2, 1917.

1,274,667.

Patented Aug. 6, 1918.
2 SHEETS—SHEET 1.

Witness
G. C. Walling
E. L. Mueller

Inventor
G. C. Berlin &
C. H. Sebree,
By Chandler & Chandler
Attorney

G. C. BERLIN & C. H. SEBREE.
VEHICLE WHEEL.
APPLICATION FILED MAY 2, 1917.
1,274,667.
Patented Aug. 6, 1918.
2 SHEETS—SHEET 2.
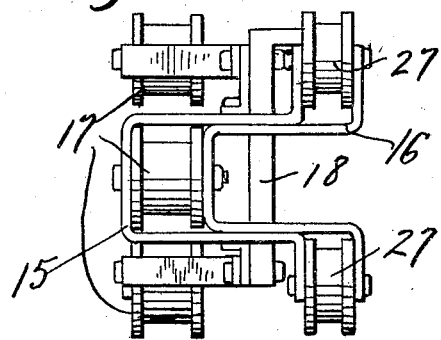
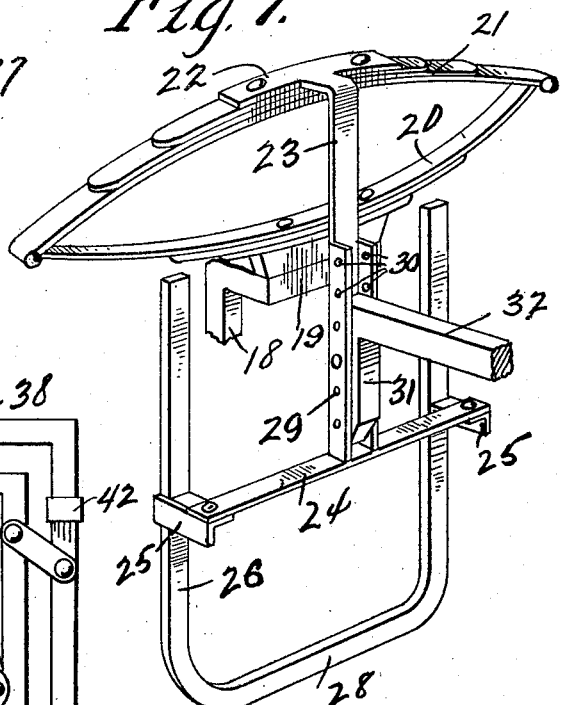
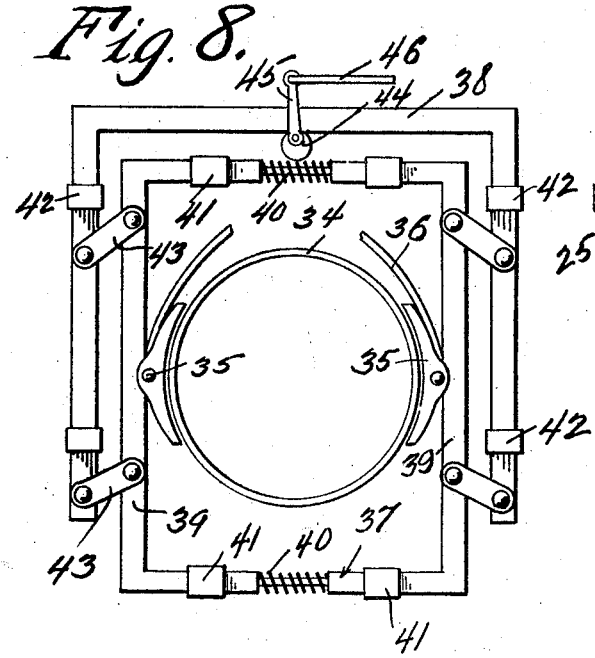
Witness
G. C. Walling
E. L. Mueller
Inventor
G. C. Berlin, &
C. H. Sebree,
By Chandler Chandler
Attorney

UNITED STATES PATENT OFFICE.

GEORGE C. BERLIN AND CHARLES H. SEBREE, OF CALDWELL, IDAHO.

VEHICLE-WHEEL.

1,274,667.         Specification of Letters Patent.         Patented Aug. 6, 1918.

Application filed May 2, 1917. Serial No. 165,938.

*To all whom it may concern:*

Be it known that we, GEORGE C. BERLIN and CHARLES H. SEBREE, citizens of the United States, residing at Caldwell, in the county of Canyon, State of Idaho, have invented certain new and useful Improvements in Vehicle-Wheels; and we do hereby declare the following to be a full, clear, and exact description of the invention, such as will enable others skilled in the art to which it appertains to make and use the same.

This invention is an improvement in vehicle wheels and has particular reference to a wheel of the hubless type.

An object of the invention is to dispense with the usual hubs and axles of vehicle wheels and, to this end, use is made of a bearing supporting frame upon which the wheel is mounted and with which is associated a vehicle attached frame, of improved construction, connected to a vehicle spring and adapted to move relative to the first named frame under the action of said spring.

Another object is the provision of an improved brake device for a wheel of this character wherein a pair of relatively adjustable frames are employed to operate brake shoes adapted for engagement with a drum carried by said wheel.

The inventive idea involved is capable of receiving a variety of mechanical expressions, one of which, for the purpose of illustrating the invention, is shown in the accompanying drawings, wherein:—

Fig. 6 is an edge elevation thereof.

Fig. 7 is a perspective view of the vehicle attached frame.

Fig. 8 is a detail plan view of the brake mechanism implied in connection with the invention.

Figure 1:
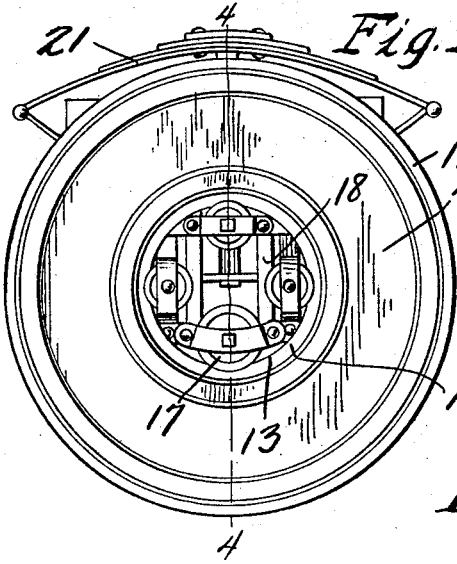
Figure 1 is an elevation of the outer side of a vehicle wheel constructed in accordance with the invention.
Figure 2:
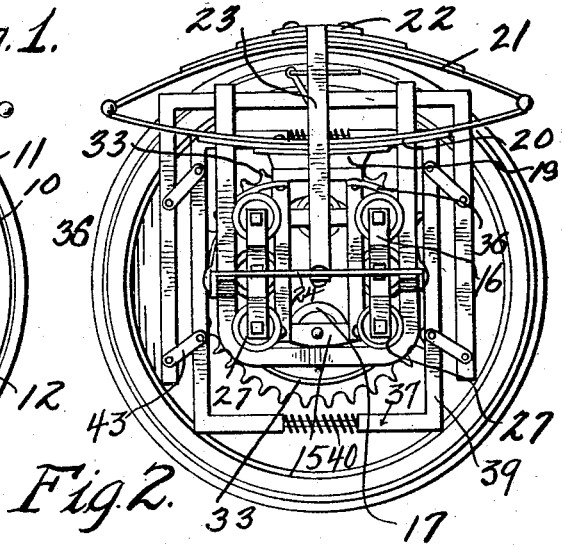
Fig. 2 is a similar view of the inner side of the wheel.
Figure 3:
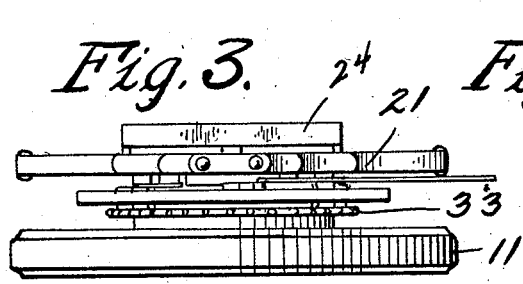
Fig. 3 is a top plan view.
Figure 4:
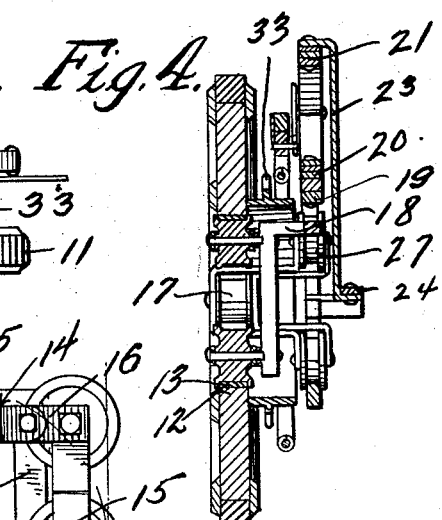
Fig. 4 is a vertical section on the line 4—4 of Fig. 1.
Figure 5:
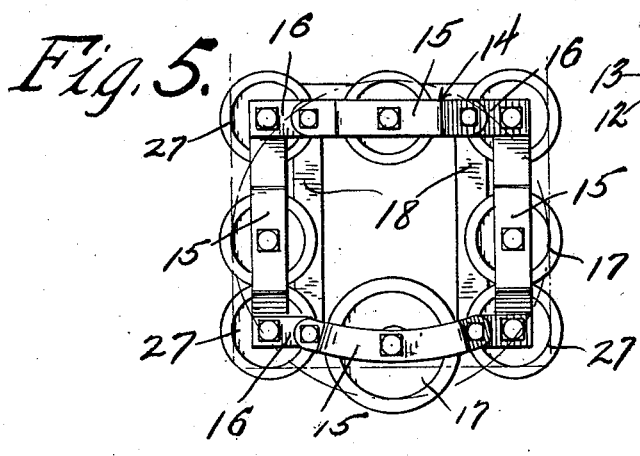
Fig. 5 is a view in elevation of the bearing supporting frame.

The invention is illustrated in what is now believed to be its preferred form and comprises a wheel body 10 having an outer rim section 11 and an inner concentric ring member 12 provided upon its inner periphery with an annular guide track 13 for a purpose which will presently appear. Mounted in the space formed by the ring member 12 is a bearing supporting frame generally indicated by the numeral 14 and consisting of a plurality of connected journal brackets 15 and 16 each of which extends in opposite directions to the next adjacent brackets, the brackets 15 preferably having mounted therein the grooved roller bearings 17 the grooves of which receive the annular flange 13 so that the wheel body will at all times be supported in a vertical position. The lowermost roller 17 is preferably made considerably larger than the other rollers since this roller receives a larger portion of the pressure caused by the weight of the vehicle.

The inner side of the frame 14 has secured thereto the lower ends of a pair of vertically arranged parallel supporting members 18, the upper ends of which having secured thereto the transverse block 19 to which the lower leaves 20 of the vehicle spring 21 are secured, the upper leaves of this spring having secured thereto at 22 the upper end of a connecting arm 23 the lower end of which is secured to the transverse arm 24 the ends of which are in turn secured to the lateral extensions 25 of the vehicle attached frame, generally indicated by the numeral 26, said extensions 25 being adapted to be secured to a vehicle frame in any preferred manner so that the weight of the vehicle will be supported by the several frames 26 of the different wheels of the vehicle. It will thus be apparent from the foregoing description that the frame 26 is vertically movable by reason of the connection between the vehicle frame and the spring 21 and in order to guide the frame 26 during its movements the brackets 16 of the frame 14 have mounted therein the grooved roller bearings 27 which receive the inner edges of the vertical sides of the frame 26, the lower ends of said sides being connected by the transverse cross piece 28. In order to vary the height of the vehicle body with respect to the wheel the latter carries a channeled supporting member 29 having a vertical row of alined openings 30 in the sides thereof, said channel member being adapted to receive a sliding block 31 carried by an arm 32 which extends beneath and is secured to the vehicle body.

The wheel is further provided upon its inner side with a sprocket wheel 33 employed for the purpose of driving the wheels when the same are used upon a motor vehicle, and secured to said sprocket wheel is a brake drum 34 having associated therewith a pair of brake shoes 35 supported by spring arms 36, carried by the supporting members 18. Means are provided for operating said brake shoes to contact the drum and preferably comprises the relatively adjustable frames, generally indicated by the numerals 37 and 38, the former being rectangular in formation and consisting of a pair of relatively movable sections 39, resiliently held apart in their inoperative positions by means of coil springs 40, the sections of said frame 37 being movable horizontally and slidably mounted in the guides 41. The frame 38 is slidable vertically in the guides 42 and has its vertical sides connected to the parallel sides of the frame 37 by means of links 43 so that when said frame 38 is adjusted the sections 39 of the frame 37 will be moved inwardly toward each other and contact the pivots 36 whereupon the brake shoes 35 will be forced into engagement with the drum 34. In order to adjust the frame 38 vertically the same is contacted by an eccentric 44 operated by a lever 45 to one end of which is connected a flexible element 46 and leading to a point convenient to the operator of the vehicle.

What is claimed is:—

1. In a vehicle wheel, the combination of a vehicle spring; of a ring member carried by said wheel, a bearing supporting frame connected with the spring and associated with said ring member and about which said ring member is revoluble, bearings carried by said frame, certain of which are in engagement with said ring member, a frame having extensions adapted for attachment to a vehicle, the main portion of said frame being slidably engaged with the other of said bearings, and a connection between the last named frame and the vehicle spring.

2. In a vehicle wheel, the combination of a vehicle spring; of a ring member carried by said wheel, a bearing supporting frame connected with the spring and associated with said ring member and about which said ring member is revoluble, bearings carried by said frame and arranged in staggered relation, certain of said bearings engaging said ring member, and a vehicle attached frame having a portion thereof slidably engaged with the other of said bearings and connected to said vehicle spring.

3. In a vehicle wheel, the combination of a vehicle spring; of a ring member carried by said wheel, a bearing supporting frame connected with the spring and associated with said ring member and about which said ring member is revoluble, bearings carried by said frame and arranged in staggered relation, certain of said bearings engaging said ring member, a second frame adapted for connection with the vehicle and engageable with the other bearings and a connection between the last named frame and the vehicle spring.

4. The combination with a vehicle wheel, having an open center and a vehicle spring, of a ring member fitted within the open center and forming a track, a supporting frame having connection with the spring, bearings carried by said frame, certain of said bearings engaged with the track and having peripheral flanges to prevent lateral displacement of said bearings on the track, a second frame slidably engaged with the other bearings, a connection between the second frame and the spring, and means on said connection for the adjustable mounting of an axle therewith.

In testimony whereof, we affix our signatures in the presence of two witnesses.

GEORGE C. BERLIN.
CHARLES H. SEBREE.

Witnesses:
A. E. HASTRO,
C. D. BURKHISER.

Copies of this patent may be obtained for five cents each, by addressing the "Commissioner of Patents. Washington, D. C."